US011887242B2

(12) United States Patent
Valsaraju et al.

(10) Patent No.: US 11,887,242 B2
(45) Date of Patent: Jan. 30, 2024

(54) CIRCUITRY AND METHOD

(71) Applicant: Arm Limited, Cambridge (GB)

(72) Inventors: Harsha Valsaraju, Austin, TX (US);
Javier Diaz Bruguera, Cambridge (GB)

(73) Assignee: Arm Limited, Cambridge (GB)

(*) Notice: Subject to any disclaimer, the term of this patent is extended or adjusted under 35 U.S.C. 154(b) by 7 days.

(21) Appl. No.: 17/363,259

(22) Filed: Jun. 30, 2021

(65) Prior Publication Data
US 2023/0005209 A1  Jan. 5, 2023

(51) Int. Cl.
*G06F 17/00* (2019.01)
*G06T 15/06* (2011.01)
*G06T 1/20* (2006.01)
*G06F 9/50* (2006.01)
*G06F 7/487* (2006.01)
*G06F 7/499* (2006.01)

(52) U.S. Cl.
CPC ............ *G06T 15/06* (2013.01); *G06F 7/4873* (2013.01); *G06F 7/4876* (2013.01); *G06F 7/49978* (2013.01); *G06F 9/5027* (2013.01); *G06T 1/20* (2013.01)

(58) Field of Classification Search
CPC ..... G06T 15/005; G06T 19/00; G06T 11/001; G06T 11/40; G06T 11/60
USPC ......................................................... 345/418
See application file for complete search history.

(56) References Cited

U.S. PATENT DOCUMENTS

| | | | | |
|---|---|---|---|---|
| 2002/0184282 | A1* | 12/2002 | Yuval ................... | G06F 9/30025 708/204 |
| 2014/0285429 | A1* | 9/2014 | Simmons ........... | G02B 27/0179 359/259 |
| 2015/0149522 | A1* | 5/2015 | Boersma ................. | G06F 7/483 708/495 |
| 2017/0263044 | A1* | 9/2017 | Peterson ................. | G06T 17/20 |
| 2017/0316116 | A1* | 11/2017 | Elliott ..................... | G06F 7/552 |
| 2019/0318528 | A1* | 10/2019 | Hunt ....................... | G06T 15/08 |

* cited by examiner

Primary Examiner — Gordon G Liu
(74) Attorney, Agent, or Firm — NIXON & VANDERHYE P.C.

(57) ABSTRACT

Circuitry comprises ray tracing circuitry comprising a plurality of floating-point circuitries to perform floating-point processing operations to detect intersection between a virtual ray defined by a ray direction and a test region, the floating-point circuitries operating to a given precision to generate an output floating-point value comprising a significand and an exponent; in which at least some of the plurality of floating-point circuitries are configured to round using a predetermined directed rounding mode any denormal floating-point value generated by operation of that circuitry so as to output normal values, a denormal floating-point value being a floating-point value in which the significand comprises one or more leading zeroes.

18 Claims, 12 Drawing Sheets

CIRCUITRY AND METHOD

BACKGROUND

This disclosure relates to circuitry and methods.

In the field of computer graphics, it is known to use a graphics processing unit, or in other words a specialised processor, to implement graphics processing commands which may be prepared by another processor.

The graphics processing unit may make use of so-called "ray tracing" during the execution of graphics processing commands.

It is in this context that the present disclosure arises.

SUMMARY

In an example arrangement there is provided circuitry comprising:

ray tracing circuitry comprising a plurality of floating-point circuitries to perform floating-point processing operations to detect intersection between a virtual ray defined by a ray direction and a test region, the floating-point circuitries operating to a given precision to generate an output floating-point value comprising a significand and an exponent;

in which at least some of the plurality of floating-point circuitries are configured to round using a predetermined directed rounding mode any denormal floating-point value generated by operation of that circuitry so as to output normal values (for example, only normal values), a denormal floating-point value being a floating-point value in which the significand comprises one or more leading zeroes.

In another example arrangement there is provided a graphics processing unit having a hardware ray tracing accelerator comprising the circuitry of claim 1.

In another example arrangement there is provided a method comprising:

ray tracing by a plurality of floating-point processing operations to detect intersection between a virtual ray defined by a ray direction and a test region, the floating-point processing operations operating to a given precision to generate an output floating-point value comprising a significand and an exponent; and for at least some of the plurality of floating-point circuitries, rounding using a predetermined directed rounding mode any denormal floating-point value generated by that floating-point processing operation so as to output normal values (for example, only normal values), a denormal floating-point value being a floating-point value in which the significand comprises one or more leading zeroes.

In another example arrangement there is provided a non-transitory computer-readable medium to store computer-readable code for fabrication of the circuitry discussed above.

Further respective aspects and features of the present disclosure are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Circuitry Overview

Figure 1:
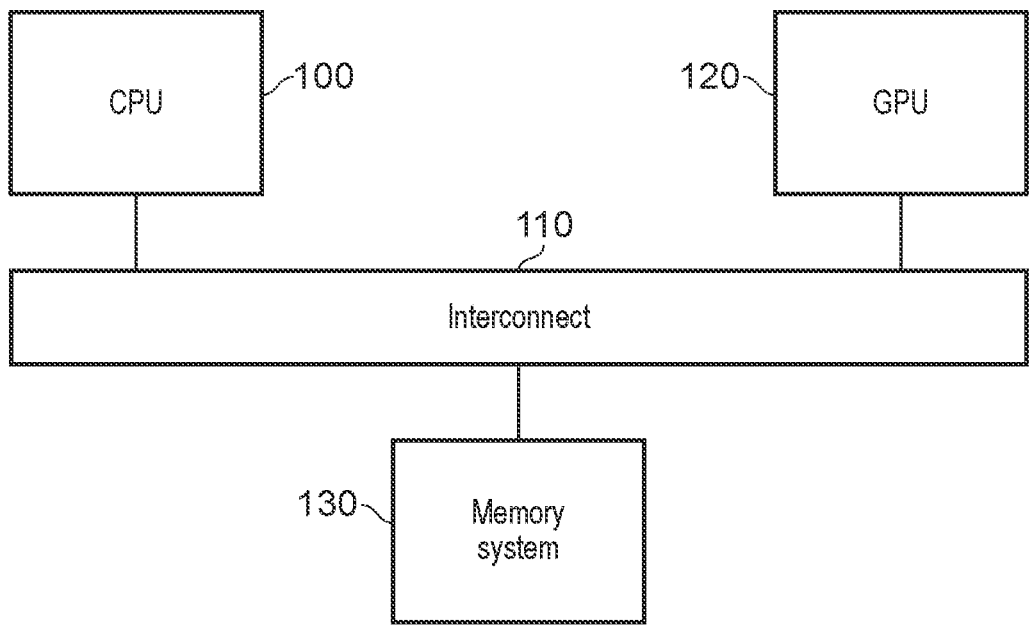
FIG. 1 schematically illustrates a data processing apparatus.

Referring now to the drawings, FIG. 1 schematically illustrates a data processing system comprising a processing element or central processing unit (CPU) 100, connected via interconnect circuitry 110 to a graphics processing unit (GPU) 120 and to a memory 130.

The CPU 100 performs general-purpose computation, which in this example arrangement refers to computational tasks which are not performed by the GPU 120. The GPU 120 is itself a specialised circuitry which is designed and implemented to perform computation relating to the creation of images very efficiently. The image information generated by the GPU 120 may output to a display device or display device driver, not shown in FIG. 1.

GPUs are not restricted to performing image-based operations and can in fact be used for other processing tasks such as implementing machine learning or artificial intelligence applications. However, several aspects of the functionality are typically well-suited to executing rendering, or the like, in order to generate image data.

In operation, the CPU 100 would typically generate a set of GPU processing tasks which are provided to the GPU 120 via the interconnect 110 for execution. Task data, such as data defining the tasks, and/or data to be processed by the tasks, may be stored in the memory system 130 to allow the GPU 120 to access each task and its associated task data in an execution order and the GPU 120 may similarly store the results of its computation in the memory system 130.

Figure 2:
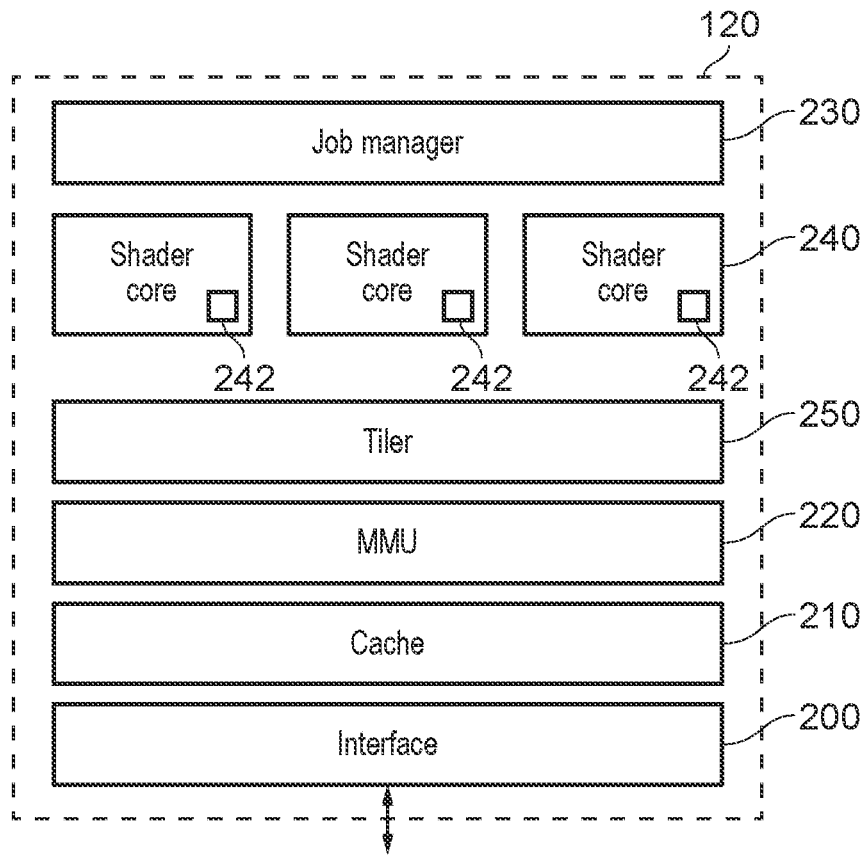
FIG. 2 schematically illustrates a graphics processing unit.

FIG. 2 schematically illustrates an example structure of the GPU 120, comprising an interface 200 for retrieving data and instructions from the interconnect 110 and providing data such as processing results back to the interconnect 110, and a cache 210 for storing data and/or instructions for input or processed data for output. A memory management unit (MMU) 220 can perform address translation where this is required.

A job manager 230 controls the execution of processing tasks or jobs established by the CPU 110, with the GPU-specific execution been performed by a set of shader cores 240 and tiler circuitry 250. The shader cores 240 are provided with hardware accelerators 242 to handle at least ray tracing operations. Note that although these are drawn schematically in FIG. 2 as being part of the shader cores, they may instead be coprocessors connected to interact with the shader cores.

The shader cores are processing units specifically optimised or designed for handling instructions, for example in the form of shader code in order to manipulate the pixels and polygon vertices within an image so as to render portions of that image.

The tiler circuitry oversees the division of the GPU rendering operations into those corresponding to discrete regions or tiles of the rendered image. This process can reduce the instantaneous memory and data transfer requirements which occur during the rendering process by the GPU 120.

Figure 3:
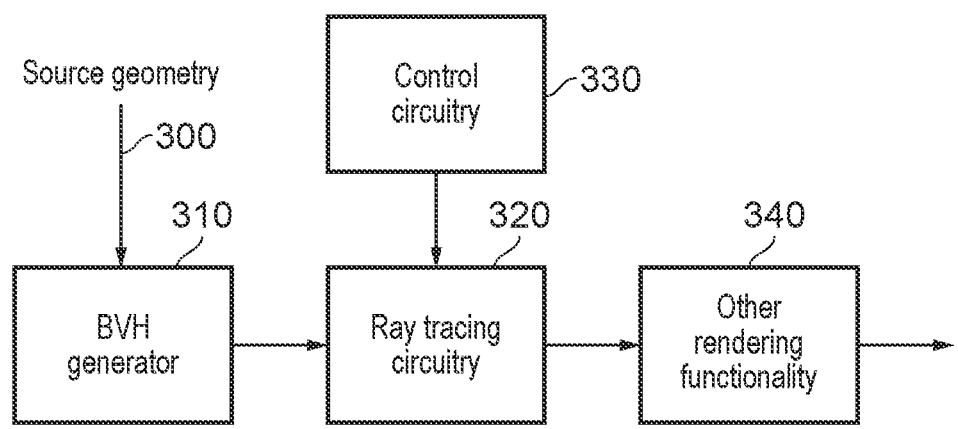
FIG. 3 schematically illustrates the use of ray tracing circuitry.

FIG. 3 schematically illustrates at least a part of the functionality of the GPU of FIG. 2, in part representing tasks performed by one or more hardware accelerators 242.

A source geometry 300, for example generated by the CPU 100 as part of the representation of a virtual scene to be rendered, is provided to a generator 310 of a so-called bounding volume hierarchy (BVH). The concepts underlying the use of a BVH will be discussed further below. The preparation of the BVH can be performed at the GPU or could be performed by the CPU so that data defining the BVH is then passed to the GPU as part of the specification of a rendering task.

One or more of the hardware accelerators 242 act as ray tracing circuitry 320. Ray tracing will be described in further detail below. The ray tracing circuitry 320 may have associated control circuitry 330, or a control function may be implemented as part of the ray tracing circuitry 320.

As will be discussed below, the ray tracing circuitry 320 may comprise a plurality of floating-point circuitries to perform floating-point processing operations to detect intersection between a virtual ray defined by a ray direction and a test region, the floating-point circuitries operating to a given precision to generate an output floating-point value comprising a significand and an exponent.

The GPU (for example, one or more shader cores 240) may also provide other rendering functionality 340 typical to the functions of a GPU and which is not described here.

Ray-Tracing

Ray tracing is a rendering technique that can potentially produce very realistic lighting effects. It typically comprises a family of algorithms built upon casting rays from a camera, shade intersection points and intersection points for secondary illumination for sampling visibility and simulate the interaction of light with the virtual objects in a synthetic 3D scene. Physically-based global illumination solutions can be built upon ray tracing, for example simulating direct illumination, shadows, specular and glossy reflection, refraction, diffusion, caustics, indirect illumination, participating media, or the like.

Figure 4:
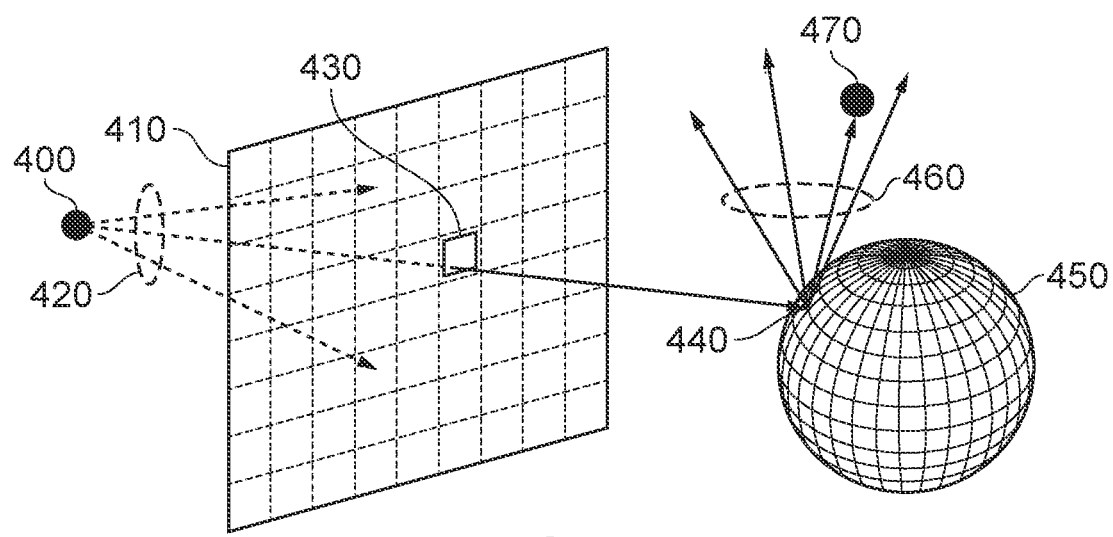
FIG. 4 schematically illustrates a ray tracing process.

FIG. 4 provides a simplified schematic representation of a ray-tracing process. This technique is used during image rendering by the ray tracing circuitry 320 to generate pixels or samples of an image by tracing so-called rays or light paths and simulating the effects of light encountering objects in the scene being viewed. It can be used as an alternative to other forms of rendering such as so-called scanline rendering. Because the processing requirements can be high, dedicated ray-tracing hardware can be provided such as the ray tracing circuitry 320 of FIG. 3.

In a physical system, light emanating from a light source hits an object and is reflected and/or refracted towards the viewing position such as a user's eye or a camera. In contrast, in rendering systems using ray-tracing, the simulation is performed by emitting simulated "rays" from a viewing position such as a virtual camera and determining what interactions they undergo when they hit an object or (whether before or after hitting an object) a light source.

Referring to FIG. 4, a virtual camera 400 is viewing a virtual object 450 in a virtual environment. The aim of the rendering process is to generate a rendered image 410 formed of multiple pixels such as an arbitrary pixel 430.

In the ray tracing technique, multiple virtual rays 420 are emitted from the virtual camera 400, passing through pixel positions such as the position of the arbitrary pixel 430 in the image 410 to be rendered. In some cases the virtual rays impact a virtual object 450, for example at a position 440. At this location on the virtual object 450, the object surface's colour, orientation, reflectivity and other optical properties affect the further propagation of the ray. A further set of simulated rays 460 is emitted from the point 440 to detect whether any of those virtual rays 460 impact a light source or indeed another object. If they do impact a light source such as an example light source 470, properties of that light source are used to determine the lighting incident upon the location 440. In other examples, if the rays 460 impact another object, then depending upon the optical properties of the location 440 and its orientation, a reflection of that other object may be rendered at the surface of the object 450.

Note that the ray tracing process to be described below can be applied to any of these ray tracing operations; for example those relating to the rays intersecting the object 450 and/or the rays intersecting the object or light source 470.

As mentioned above, the ray-tracing process can be very computationally expensive, particularly where the virtual scene includes many virtual objects and virtual light sources. Each virtual ray must be tested as to whether it intersects with each object in the scene.

Bounding Volume Hierarchies

Figure 5:
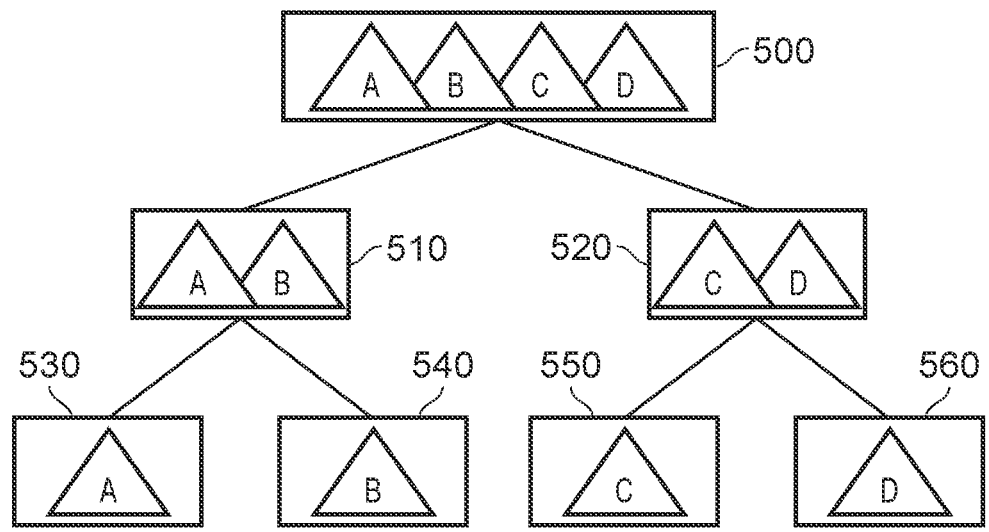
FIG. 5 schematically illustrates a bounding volume hierarchy (BVH)

So-called bounding volume hierarchies (BVHs) will now be described briefly with reference to FIG. 5.

A BVH is a hierarchical tree structure of volumes which provides a way of representing objects within a virtual environment. BVHs were first proposed as a technique for reducing the quantity of computation required to implement ray tracing. In principle, to perform ray tracing, rays have to be tested for intersection with every point on an object. In contrast, a BVH provides a hierarchical set of volumes enclosing an object. These are hierarchical in the sense that a highest level of the BVH represents a largest volume and successive lower levels down to so-called leaf nodes each representing a single triangular primitive (a) are contained within the next higher level and (b) are smaller than the next higher level.

Therefore, each geometric object in the generated virtual environment is contained within or "wrapped" in a bounding volume forming the lowest level or leaf nodes of the tree structure. In FIG. 5, four example geometric objects A, B, C, D are represented, with each having a respective leaf node 530, 540, 550, 560 providing a definition of a bounding volume containing just a single primitive representing that geometric object. At a next higher level, the leaf nodes are grouped as small localised sets of leaf nodes and are enclosed within a larger bounding volumes defined by tree structure nodes 510, 520. These in turn are recursively grouped and enclosed within other, more extensive, bounding volumes defined by higher level nodes such as a node 500 of FIG. 5. Ultimately, there will be a single bounding volume as a highest level node in the tree structure.

In a ray tracing arrangement using a BVH, a simulated ray is first tested to detect whether it intersects with a particular volume. If so, the volume is recursively divided until the ray hits the object. The process can be improved by forming bounding volumes such that they are generally similar to the shape of the underlying object or objects so as to avoid performing too many detections on effectively empty space within a bounding volume.

In an empirical example, direct implementation of ray tracing (without the use of BVHs) is indeed complex and expensive. To render a complete image at least 1 ray must be cast per pixel. For a 1920×1080 image 2,073,600 primary rays are required. In addition, each ray must be tested against each primitive triangle. The result in an example arrangement is that about 212 intersections need to be computed. This quantity of competition can be heavily reduced in an example arrangement using BVHs, for example one in which primitive triangles are in a BVH node tree, with a default value of six boxes per node and a warp of rays traverses the tree in a coherent way.

Hardware Acceleration—Overview

Although ray tracing can be performed by programmable shader cores executing appropriate computer software instructions, in example arrangements, the GPU makes use of hardware acceleration to provide the ray tracing circuitry 320.

In the example to be described below, two hardware accelerators are provided at each shader core and collectively provide the functionality of the ray tracing circuitry 320. These are (a) circuitry to provide a ray-box intersection test or in other words a test for the intersection between a so-called warp of rays (16 rays) and a wide node (a set of six boxes or volumes), as shown schematically in FIG. 6; and (b) circuitry to provide a ray-triangle intersection test to compute the intersection between a warp of rays (16 rays) and triangles in leaf nodes, as shown schematically in FIG. 7.

Techniques will be described which potentially allow pipelined operation with relatively low, or at least reduced in comparison with some other designs, latency.

Both the ray-box and ray-triangle intersection circuitries in these examples use a single-precision floating-point representation for inputs and internal variables and require a large number of floating-point additions and multiplications and some floating-point divisions.

A low-latency (or at least reduced latency) implementation is obtained by (i) employing parallelism, (ii) using a fully pipelined design, and (iii) simplifying the microarchitecture of the floating-point operations so that every floating-point operation with the rounding, but the division, fits in just 1 cycle.

Each floating-point operation is mapped in the circuitry as soon as its operands are ready, and the hardware operators are not reused. This way the number of parallel operations is potentially improved although potentially at the expense of a larger integrated circuit area.

The pipelined design approach means that the intersection of one ray with six boxes of each BVH level is processed per cycle. Note that in an alternative, the intersection of one ray with one box could be tested per cycle so that multiple passes to test the intersection with the six boxes of the node. However, this approach would potentially need a larger number of cycles per BVH level.

The microarchitecture of the floating-point operators is simplified by removing the input and output denormal support.

The term "denormal", sometimes expressed as "sub-normal", referring to numbers where, in a given numerical representation, the representation would require an exponent that is below the smallest representable exponent. Where denormal support is provided, such numbers may be represented using leading zeros in the significand.

In some systems, denormal support is used to avoid the accidental generation of zero values in place of values which are simply just very small (or sub-normal), for example so as to avoid subsequent divide-by-zero errors or the like.

In contrast the present embodiments instead use a fixed directed rounding modes for every single floating-point operation, and using a reduced precision in the floating-point operations in ray-box intersection. Regarding the absence of denormal support, denormal results in ray-box intersection test are rounded to a minimum normal representation or zero based on rounding mode for conservative box coordinates; on the other hand, denormal inputs and outputs in the ray-triangle intersection test are flushed to 0.

Therefore, this provides an example in which at least some of the plurality of floating-point circuitries of the ray tracing circuitry are configured to round using a predetermined directed rounding mode any denormal floating-point value generated by operation of that circuitry so as to output normal values (for example, only normal values), a denormal floating-point value being a floating-point value in which the significand comprises one or more leading zeroes.

The ray-box intersection test can use single-precision adders and multipliers with reduced-precision mantissas. While the standard single-precision representation has 24-bit mantissas, the ray-box intersection test module produces accurate results with smaller mantissas: the number of fraction bits is 7, 10, 13 or 15 bits (noting that the number of mantissa bits is equal to the number of fraction bits +1, giving respective mantissa word lengths of 8, 11, 14 and 16 bits). Smaller precision modules are much smaller than standard single-precision adders and single-precision multipliers; for example, the smallest adders used in the present examples potentially occupy about half the integrated circuit area of a single-precision adder. In the diagrams to be described below, single precision is represented by the initials "SP".

These simplifications make possible that the floating-point additions and multiplications in the ray-box intersection test and the ray-triangle intersection test modules fit in just one cycle. Regarding the single-precision division, the usually long-latency division implementation (in the previously proposed ray tracing circuitry) by a reciprocal and multiplication. Reciprocal module is implemented with a maximum error of 1 unit in the last place or bit position ("ulp") to bring down reciprocal latency to one cycle. This way, the division can be accomplished in potentially just two cycles—in other examples more cycles could be allowed for a corresponding potential reduction in power consumption.

Figure 6:
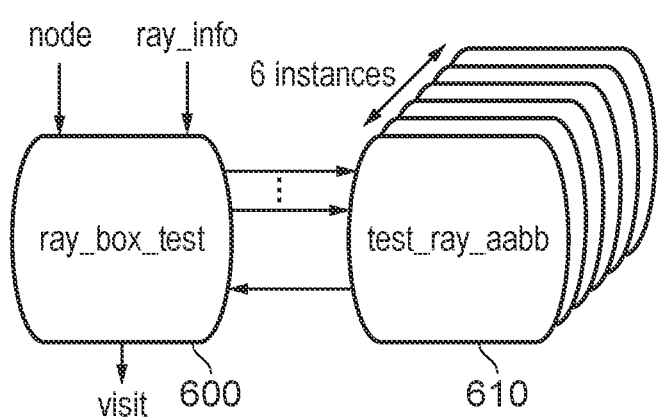
FIG. 6 schematically illustrates ray box test circuitry.

An overview of the two main circuitries is provided by FIGS. 6 (ray box test) and 7 (ray triangle test).

Referring to FIG. 6, the ray box test circuitry comprises two main modules: ray_box_test 600 and six instances of test_ray_aabb 610 (one for each of the BVH boxes to be tested). In ray_box_test 600, the node and ray information are unpacked, some special cases are handled and some computations relating to parent distance calculations are carried out. The six instances of test_ray_aabb are controlled by information passed to them from ray_box_test 600 to compute each of the six children's distance from the origin and to determine whether or not the ray intersects the respective box.

In these examples, the ray tracing circuitry is configured to detect intersection of the virtual ray with a hierarchical set of bounding volumes. For example, at a given hierarchy level, each bounding volume comprises a predetermined number (such as six in this example) of bounding volumes at a next lower hierarchy level. The use of six instances of test_ray_aabb 610 provides an example in which the ray tracing circuitry is configured, for the given hierarchy level, to detect intersection of the virtual ray with each of the bounding volumes at the next lower hierarchy level, for example by using the predetermined number of intersection-detecting circuitries operable in parallel, one intersection-detecting circuitry being configured to detect intersection for a respective one of the predetermined number of bounding volumes at a next lower hierarchy level The inputs to ray_box_test 600 are as follows, noting that the ray box test circuitry operates at any arbitrary level in the BVH except for the leaf level:

node (for example (x, y, z)) coordinates of a predetermined point such as a predetermined lower vertex of the parent volume to be tested, along with six offsets (which are therefore always positive), one for each child volume ray_info (for example, data defining a ray vector and its origin) and the output is:

visit (indicating a result, for example in the form of a six bit vector with each bit indicating a "yes/no" outcome for whether the ray intersects a respective one of the six child boxes.

Note that if the output vector "visit" indicates "yes" for any of the child boxes, then that child box becomes the parent box for a next iteration of the ray box test operation.

Figure 7:
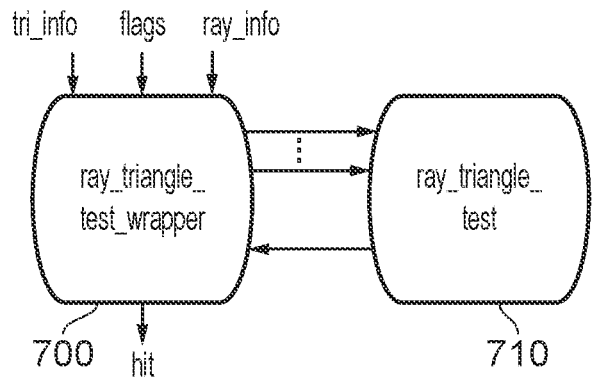
FIG. 7 schematically illustrates ray triangle test circuitry.

Referring to FIG. 7, the ray triangle test circuitry also comprises two modules as drawn: ray_triangle_test_wrapper 700 and ray_triangle_test 710. The ray_triangle_test_wrapper 700 unpacks the input operands, handles some special cases and instantiates and passes information to the ray_triangle_test 710, which in turn determines whether or not the ray intersects the triangle.

The inputs to ray_triangle_test_wrapper 700 are as follows:

tri_info (providing information on the triangle to be tested, in particular in this example 3 sets of coordinates each defining a respective vertex)

flags (for example parameters for the triangle to be tested such as opacity; note that in the case of an opaque triangle, a "miss" (non-intersection) is returned as the result)

ray_info(for example, data defining a ray vector and its origin) and the output is:

hit (indicating a result as to whether the ray intersects the triangle or not, the distance along the ray to the point of intersection and barycentric coordinates of the point of intersection, where the barycentric coordinates are coordinates according to a system by which the location of a point is specified by reference to the triangle) These circuitries will now be described in more detail with reference to FIGS. 8-13.

Figure 8:
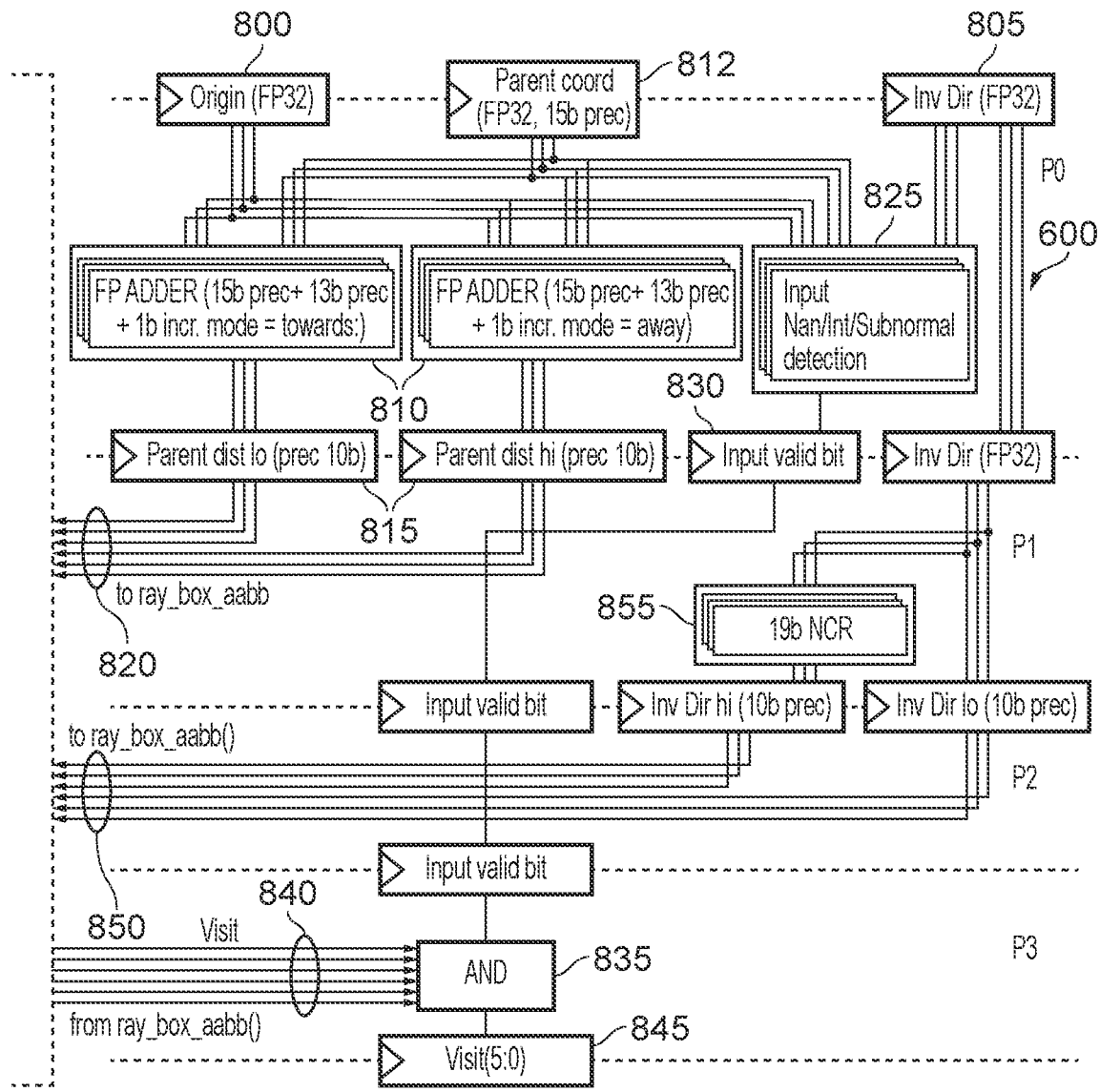
FIGS. 8-13 schematically illustrate circuitry specific to the arrangements of FIG. 6 or 7.

FIG. 8 (Ray_Box_Test 600)

Referring to FIG. 8, in common with at least some of the other diagrams to be described, a representation of a pipelined operation by the division of the diagram into horizontal sections or slices separated by a broken horizontal line and denoted by pipeline cycles P0, P1, P2 and so on. The operations at P0 are performed first, followed by operations at P1 and successive instances of Pn. These may be performed in adjacent or successive cycles but this is not necessarily a requirement, just that (for any given one of the diagrams) Pm takes place after Pn where m>n.

Therefore, in these examples, the ray tracing circuitry is configured to perform processing operations according to clock cycles of a succession of clock cycles. In some examples, each of the floating-point circuitries is configured to perform a respective floating-point operation according to a single respective one of the succession of clock cycles. In at least some examples, the ray tracing circuitry operates as pipelined circuitry having a plurality of successive pipeline stages.

The input parameter ray_info provides an origin 800 and an inverse direction 805 (an inverse or reciprocal direction) representation is used. The input parameter node provides parent coordinates 812. The precision of representation of these and other values within the circuitry to be described is denoted by a number of bits ("b") and also where relevant a floating-point representation such as a 32 bit floating-point (FP) representation "FP32".

In other words, the ray tracing circuitry is responsive to ray data indicating the ray direction, the ray data defining a reciprocal of a ray vector representing the ray direction, which conveniently allows the ray tracing circuitry to use multiplier circuitry configured to perform a division by the ray vector by implementing a multiplication by the ray data defining the reciprocal of the ray vector.

Circuitry 810 derives, for each of the (x, y, z) coordinates, a distance of the parent vertex from the origin along the direction of the ray. This is calculated twice by the respective units 810 to generate the same outcome but with different rounding: one derivation (to generate "Parent dist lo") is rounded towards the ray direction and the other derivation (to generate "Parent dist hi") is rounded away from the ray direction. The floating-point adders implemented by the circuitry 810 operate to a 15 bit precision. However, the output variables Parent_dist_lo and Parent_dist_hi 815 are provided to a 10 bit precision the sending 822 each instance of ray_box_aabb. This addition and rounding is performed in a single cycle. In connection with the precision of operation associated with these circuitries, and as denoted by the notation contained within the respective boxes as drawn in FIG. 8, the following notes are provided:

"Precision" represents the number of fraction bits with useful information. For example: Parent Coordinates are FP32 numbers with 15 fraction bits. The lower 8 bits are always 0 and so do not contain useful information.

The input origin 800 needs to be rounded/truncated to have only 13 bits of precision before being subtracted from the parent coordinates 812. This is done to save circuit area in an integrated circuit implementation.

For calculating Parent_dist_hi, origin 800 needs to be rounded away from the direction of the ray. For calculating Parent_dist_lo, origin 800 needs to be rounded towards the direction of the ray. This ensures that the box coordinates are still conservative (the constructed box might be slightly bigger than if it were using full precision, but it is noted in this context that that it considered acceptable to report a false hit, but not a false miss).

Instead of adding a rounding module to truncate "origin", the example arrangement provides logic or circuitry in the adders within the circuitries 810 to do this along with the FP addition. This allows the circuitries to save implementation area and perform both origin rounding and parent distance calculation in the same cycle. That is why the notation associated with the boxes 810 has an extra "+1b incr" term. In other word the adders in the boxes 810 have an additional "incr" input. If the origin needs to be rounded to zero (i.e truncated to 13 bits), "incr" would be 0. If the origin needs to be rounded away from zero, incr input would be 1, implying that origin need to incremented by 1 at origin bit position 10.

Circuitry 825 detects one or more conditions relating to invalidity of the data so as to generate an input valid bit 830 which is provided to output circuitry 835 and used to gate the "visit" outputs 840 received back from each of the ray_box_aabb (the generation of which will be described below). If the input valid bit 830 indicates "invalid" then the output circuitry 835 (for example, an AND circuit in which each of the visit signals is subject to an AND combination with the input valid bit) sets the eventual output visit signals 845 to 0 (miss).

The inverse direction 805 has its precision reduced to 10 bits, rounded up (Inv Dir hi) or down (Inv Dir lo) for sending 852 each instance of ray_box_aabb. This is achieved by circuitry 855 which increments a given bit of Inv Dir to generate a value which is subjected to reduced precision to generate Inv Dir hi. In the example shown, the size of the incrementor is 19 bits wide. The increment happens at bit 13 (inv_dir[31:13]+1'b1).

Therefore, the data sent to each instance of ray_box_aabb comprises the parent distance (lo and hi) at 10 bit precision and the inverse direction (lo and hi) at 10 bit precision, and the data received back from the instances of ray_box_aabb comprises the visit flags.

Flags or indicators tmax and tmin (part of the ray_info) are also provided to ray_box_aabb. Here, tmin is the distance along the ray to start looking for intersection. Tmax is the distance along the ray to stop looking for intersections.

Figure 9:
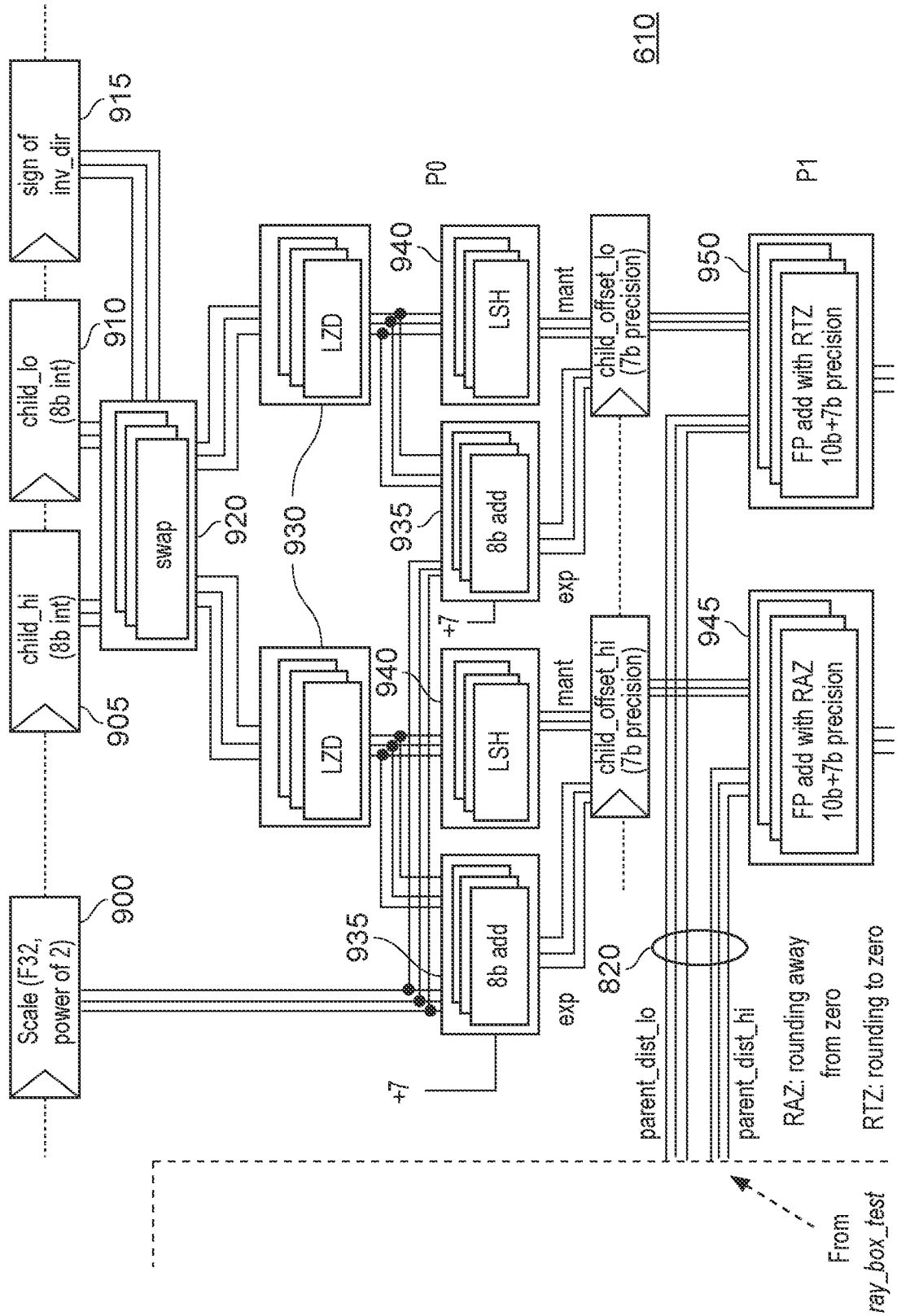
Figure 9:
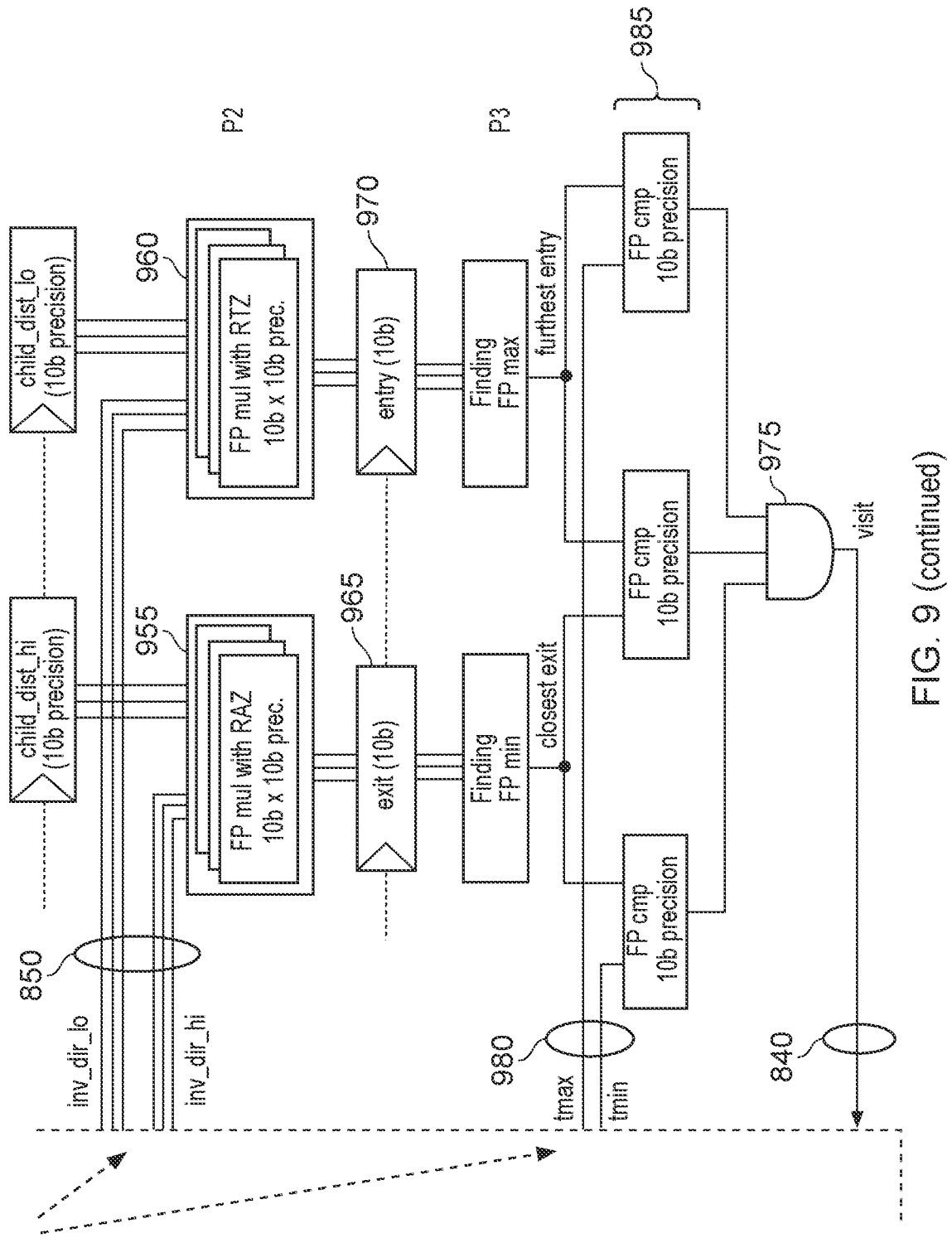

FIG. 9 (Ray_Box_aabb 610)

FIG. 9 schematically illustrates one instance of ray_box_aabb 610 which receives the signal's 820, 850 from ray_box_test 600 and generates a single instance of the visit flag 840 to be returned to ray_box_test 600.

The calculations in FIG. 9 are also responsive to a scale value 900 which is part of the node along with parent and child coordinates. The scale value 900 is expressed as a power of two, and child vertices at the upper right 905 and lower left 910 positions are expressed relative to the vertex of the parent volume and the sign 915 of the inverse direction. Circuitry 920, 930, 935, 940 operating during the pipeline stage P0 generates the exponent (exp) and mantissa (mant) of 7 bit precision values child_offset_hi and child_offset_lo, being rounded upwards or downwards respectively. In particular, the circuitry 930 comprises leading zero detectors (LZD) and the circuitry 940 comprises left shifters (LSH).

In more detail, at the circuitry 920 the child_hi 905 and child_lo 910 data are swapped depending on the sign of the inverse of the direction. This is not an arithmetic operation but rather a selection of child_hi or child_lo as input to the modules 930.

The outputs of the swapping circuitry 920, which are integer numbers, are converted to a floating-point scaled number. This is done by computing the mantissa in the LZD-LSH modules 930, 940 and the exponent in the 8-bit adders 935.

The mantissa calculation consists of detecting the number of leading zeros in the integer value (circuitry 930, LZD) and left-shifting the integer value (circuitry 940, LSH) to place the first non-zero bit at the most-significant position, because the floating-point value is normalized. The 8-bit integer value is converted to floating-point with 7-bit fraction plus the hidden integer bit.

The exponent is computed in 935 from the scaling factor and the number of leading zeros.

In a pipeline stage P1, adders 945, 950 combine Parent_dist_hi with child_offset_hi using "RAZ" (rounding away from zero) to generate child_dist_hi expressed to a 10 bit precision, being the child volume's offset from the origin rounded up, and combine Parent_dist_lo with child_offset_lo using "RTZ" (rounding towards zero) to generate child_dist_lo expressed to a 10 bit precision, being the child volume's offset from the origin rounded down.

In a pipeline stage P2, a pair of floating-point multipliers 955, 960, using RAZ and RTZ respectively generate exit 965 and entry 970 values by multiplying the inverse direction (hi and lo respectively) with the child distance (hi and lo respectively). These represent the maximum and minimum possible intersection points with the child volume under consideration, and circuitry operating in a pipeline stage P3 compares these with tmax and tmin 980 received from ray_box_test representing a range of distances along the ray which are to be checked.

The logic executing in P3 generates a true outcome for the indication visit when (by an AND gate 975) all of the following conditions (tested by respective 10 bit comparators 985) are met:

furthest entry<=tmax
closest exit>=tmin
closest exit>=furthest entry

The visit indication 840 is returned to ray_box_test. As discussed above, for any of the child volumes for which visit is true, that child volume becomes (under the control of the control circuitry 330) a parent volume for a next iteration of the operation of the circuitry of FIG. 6.

Ray_Triangle_Test_Wrapper 700

In contrast to ray_test_box 600, this simply forwards information it receives (as set out in FIG. 7) to the ray_triangle_test circuitry 710 and forwards the "hit" indication from ray_triangle_test. Therefore, detailed circuitry does not need to be described here. The testing of intersection with a triangle is performed by the ray_triangle_test circuitry 710.

FIGS. 10-13 (Ray_Triangle_Test Circuitry 710)

The arrangement for testing whether a particular primitive triangle is intersected by the ray under test is instantiated when the testing performed in respect of the BVH reaches a leaf node level. Testing performed at levels above the leaf node level simply indicates that a next level down of the BVH should be tested. It is the final test performed in respect of a primitive triangle which is definitive in terms of setting display parameters of that primitive triangle. The passing of data between the ray box testing and the ray triangle testing may be performed by the control circuitry 330 as described above.

Figure 10:
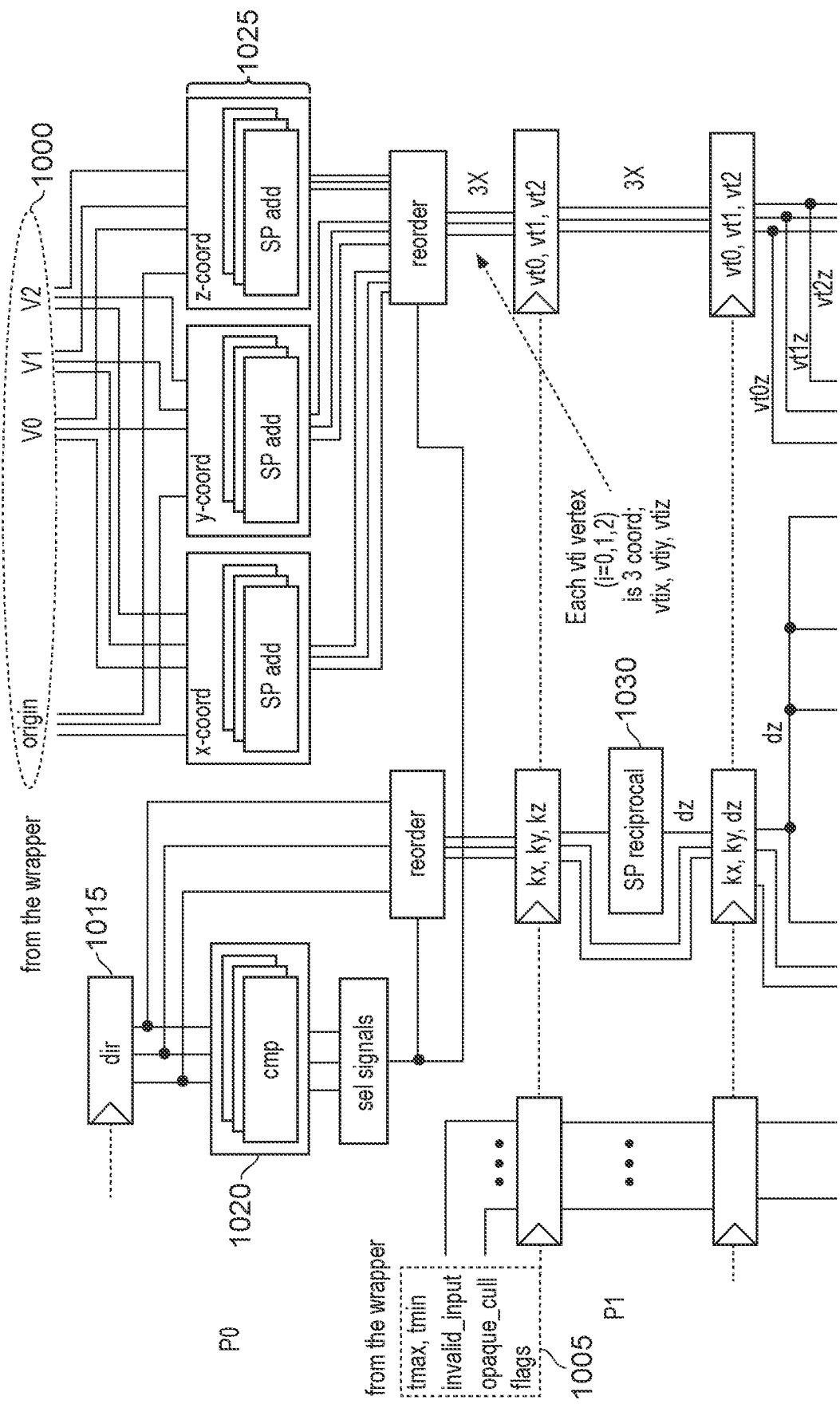
Figure 10:
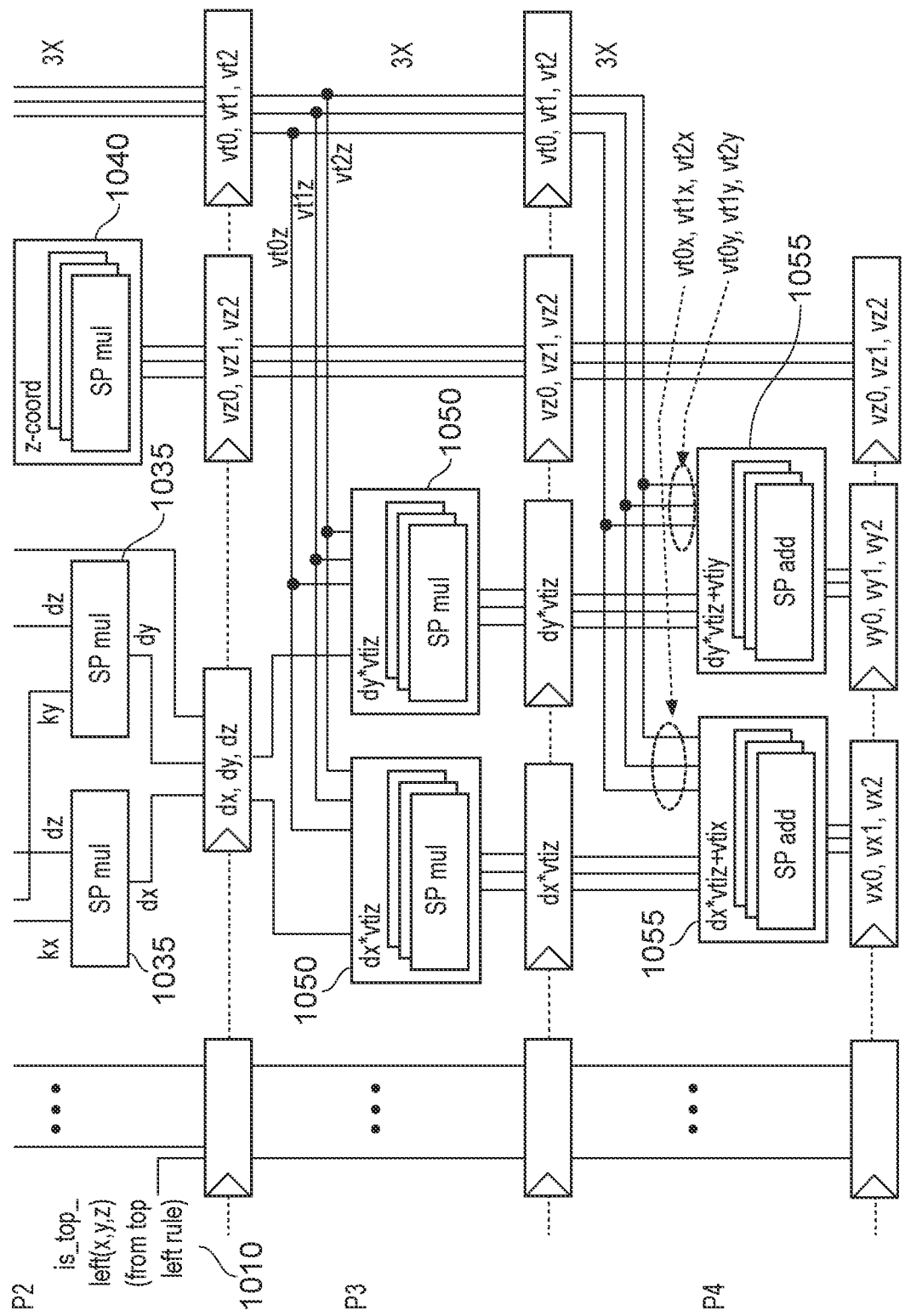
Figure 11:
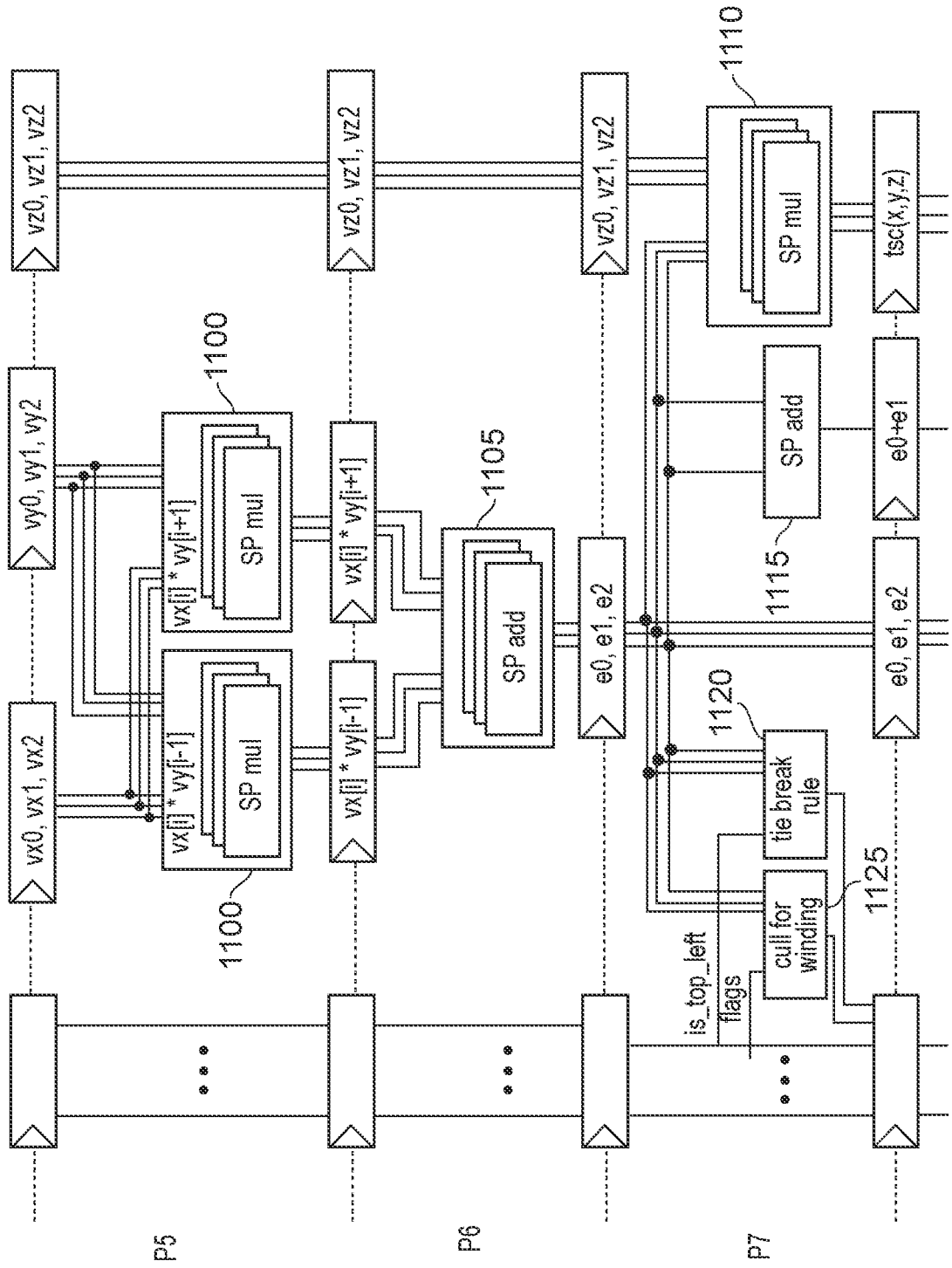
Figure 11:
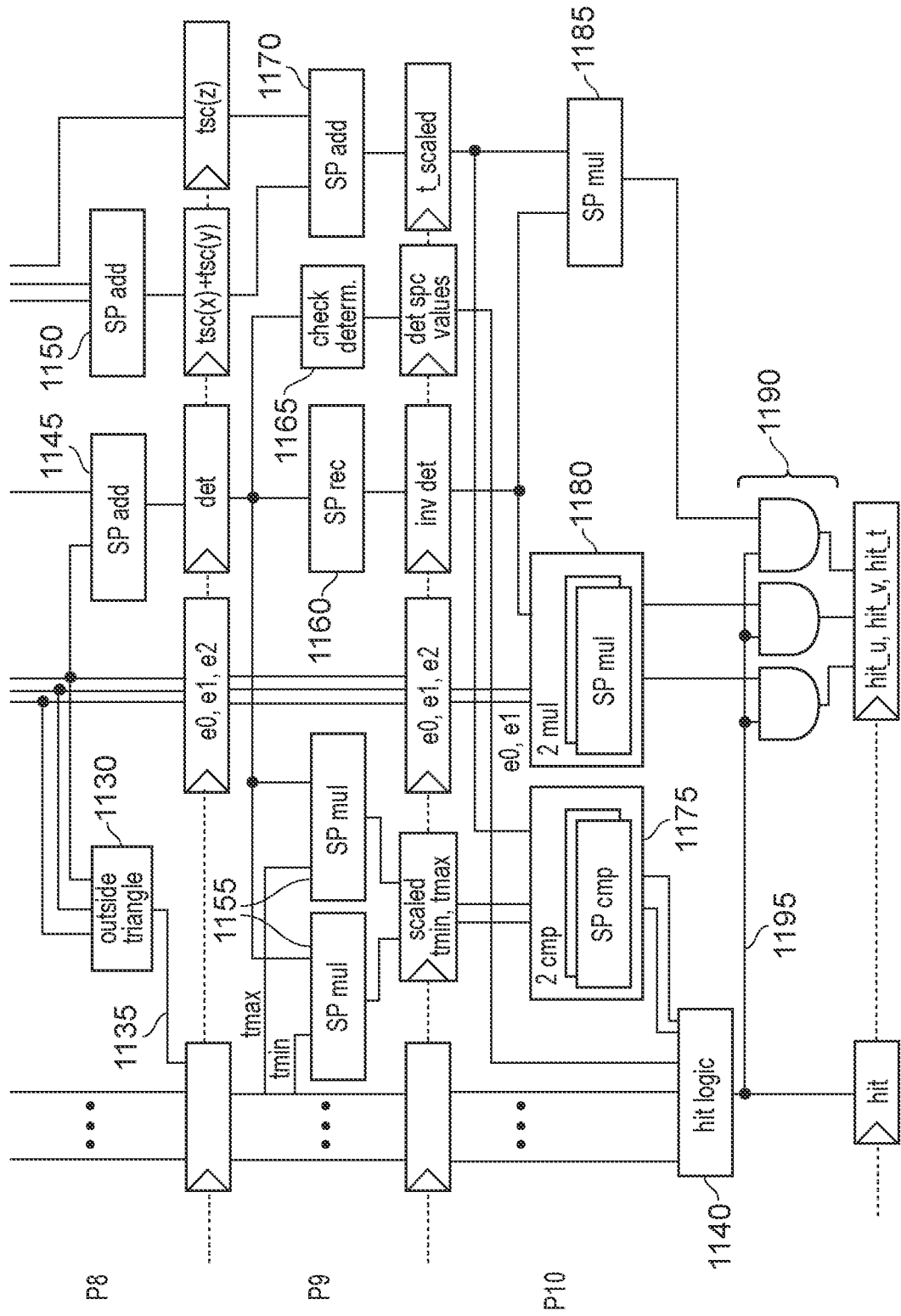

FIGS. 10 and 11 combine to illustrate the operation of the ray_triangle_test circuitry 710, in that FIG. 10 schematically represents pipeline cycles P0-P4 whereas FIG. 11 schematically represents pipeline cycles P5-P10. As mentioned above, this relates to an example arrangement—the number of cycles could be different in other examples in return for a potential change in power consumption.

Referring to FIG. 10, the circuitry 710 receives from the ray_triangle_test_wrapper circuitry 700 data 1000 defining the origin and three vertices V0, V1, V2 of the triangle under test; data 1005 providing the range indications tmax, tmin mentioned above; and flags indicating an invalid input, and opaque triangle and the like and the ray direction 1015. A top left flag 1010 will be described further below.

During a cycle P0, adders 1025 add the respective x, y and z coordinates of the vertices V0, V1, V2 to that of the origin so as to generate a translated vertex distance coordinate with respect to the origin. Comparator circuitry 1020 compares the vector coordinates of the ray to detect the largest of them. The coordinates of the ray and of the outputs of the adders 1025 are reordered so that the other two coordinates are referenced relative to the largest coordinate. This has the effect of simplifying the calculations which follow to a two-dimensional problem to be resolved.

During a cycle P1, circuitry 1030 generates the reciprocal of the largest coordinate, so that the other two reordered coordinates are now referred to as kx, ky and the reciprocal of the largest coordinate is referred to as dz.

At a cycle P2, multipliers 1035 generate:

$$dx = kx * dz; \text{ and}$$

$$dy = ky * dz$$

and a multiplier 1040 generates values vz equal to the value dz multiplied by the z value vtnz (reordered largest coordinate) of the translated vertex distance coordinates from the origin.

At a cycle P3, multipliers 1050 multiply the z value (reordered largest coordinate) of the translated vertex distance coordinates by dx and dy respectively.

At a cycle P4, adders 1055 add the output of the adders 1050 to the respective x and y values (reordered non-largest coordinates) vtnx, vtny of the translated vertex distance from the origin.

The variables passed onto FIG. 11 are vxn, vyn and vzn, where n=0 . . . 2 for each of the vertices.

Moving on to FIG. 11, at a cycle P5, multipliers 1100 perform the calculations vx[i]*vy[i−1] for i=1, 2 and vx[i]*vy[i+1] for i=0,1. These are added together by adder circuitry 1105 in a cycle P6 to generate values e0, e1, e2.

In more detail, in P5 and P6 the following are generated by the circuitries 1100, 1105:

$$e0 = (vx[2]*vy[1]) - (vy[2]*vx[1])$$

$$e1 = (vx[0]*vy[2]) - (vy[0]*vx[2])$$

$$e2 = (vx[1]*vy[0]) - (vy[1]*vx[0])$$

It is as the [i−1] and [i+1] index may be considered to increment in a circular or modulo 2 fashion or in other words 0→1→2→0, $$(i+1) = 1 \text{ If } i = 0$$
$$= 2 \text{ if } i = 1$$
$$= 0 \text{ if } i = 2$$
$$(i-1) = 2 \text{ if } i = 0$$
$$= 0 \text{ if } i = 1$$
$$= 1 \text{ if } i = 2$$

At a cycle P7, various actions are taken. Multiplier circuitry 1110 multiplies en*vzn to generate tsc(x, y, z). This is part of the scaled depth of vertices computation. This computation is done in cycles P7, P8 and P9. A final scaled depth, t_scaled, is obtained in P9, as t_scaled=tsc(x)+tsc(y)+tsc(z).

Adder circuitry 1115 adds e0+e1. Tie-break circuitry 1120 (to be described further with reference to FIGS. 12 and 13 acts in respect of dealing with a tie-break situation and culling circuitry 1125 responsive to the flags discussed above generates a culling signal which overrides the generation of a hit.

At a cycle P8, detector circuitry 1130 detects from the e0, e1, e2 values whether the ray is outside of the triangle and if so provides an indication 1135 to hit logic 1140 to be described below. Adder circuitry 1145 generates det=(e0+e1+e2) and adder circuitry 1150 adds tsc(x) +tsc(y).

At a cycle P9, det is multiplied by tmax and tmin by multipliers to provide scaled tmax, tmin. Reciprocal circuitry 1160 calculates the reciprocal of det, Inv det, circuitry 1165 checks the determinant det and adder circuitry 1170 generates t_scaled=tsc(x)+tsc(y)+tsc(z). If the determinant is zero then this is assumed to be indicative of there not being a hit.

Finally, at a cycle P10, comparator circuitry 1175 compares the scaled tmax, tmin with t_scaled to confirm that any intersection lies within the required ray range defined by tmax, tmin, the output being provided to the hit logic 1140, multipliers 1180 multiply each of e0, e1 by Inv det and multiplier circuitry 1185 multiplies t_scaled by Inv det. The outputs of the two multipliers 1180 and the multiplier 1185 are provided to and gates 1190 where they are gated by a signal 1195 generated by the hit logic. In particular, if the ray hits the triangle, hit=1, the barycentric coordinates of the actual intersection, hit_u and hit_v, and the distance from origin, hit_t, are provided as an output. The barycentric coordinates and the distanced are forced to be 0 if a hit does not happen, hit=0.

Figure 12:
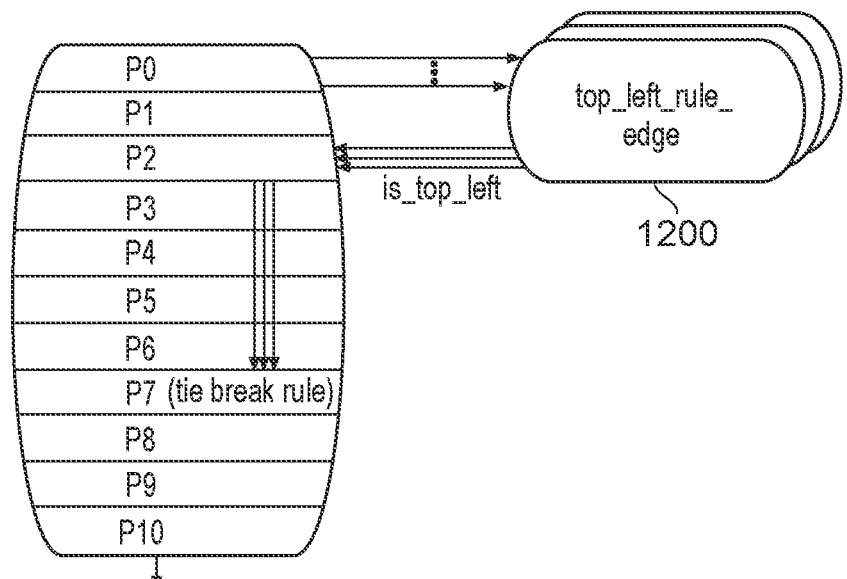
Figure 13:
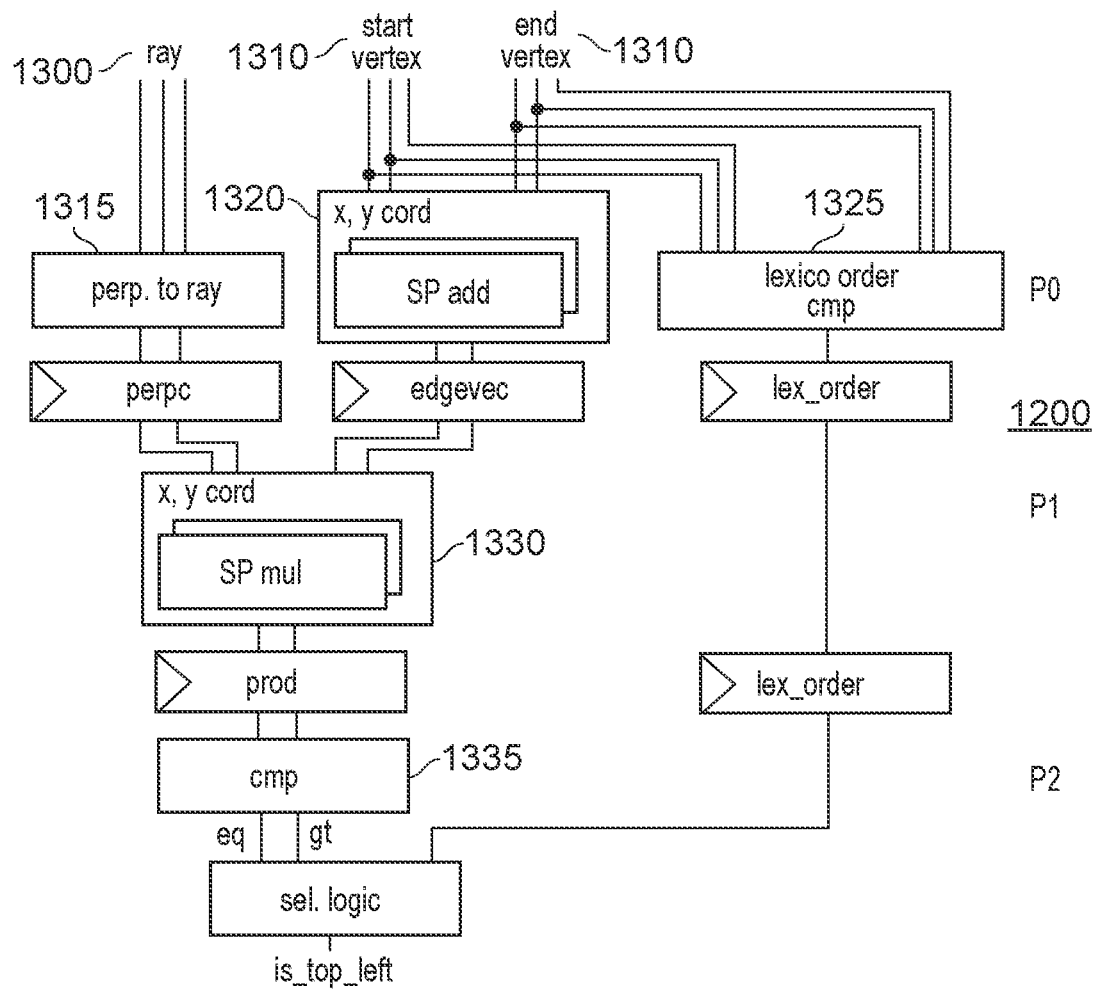

FIGS. 12-13 (Tie Break Rule Circuitry 1120)

A so-called tie-break situation can occur when a particular pixel position lies on the boundary between two or more triangles (for example, intersection can happen on an edge shared by 2 triangles or on a vertex shared by multiple triangles). Fundamentally, intersection is deemed to occur if a pixel position is within a triangle or if it is on an edge defined by the so-called top-left rule. So, given that the intersection test performed by the circuitry described above will give a true outcome if the intersection position is within the triangle or on an edge, the top-left rule decides whether an edge intersection is with an edge complying with the top-left rule such that the current triangle would "win" over another triangle sharing that edge.

The relevant testing can be applied without knowledge of an adjacent triangle, simply by detecting whether an edge such as an edge at which an intersection is detected would comply with the top-left rule. If it would, then the intersection is detected as a valid hit. If not, then an intersection with the adjacent triangle would win and so the intersection is detected not to be a valid hit.

As shown schematically in FIG. 12, three instances of top-left rule circuitry 1200 act on respective ones of the three triangle edges. FIG. 13 shows one such instance. In terms of timing, the circuitry 1200 receives data during P0 defining the two vertices which in turn defined the edge to be considered and return a value "is_top_left" relevant to that edge during P2. The tie break rule circuitry 1120 detects, for an intersection at a given edge, whether the is_top_left flag is set to indicate that the given edge would win against an adjacent triangle. If so, then the hit logic 1140 is controlled to allow a hit at that edge, but if not the hit logic 1140 is controlled to deny a hit at that edge. The processing relating to the tie-break rule circuitry 1120 is performed at P7 as shown schematically by FIG. 12.

The circuitry 1200 therefore provides an example of conflict detection circuitry configured to determine, for a detection of an intersection between a given virtual ray and a set of two or more contiguous test regions, which of the set of two or more contiguous test regions is intersected by the given virtual ray. In the present example, the conflict detection circuitry 1200 is operable in parallel with the ray tracing circuitry to provide the determination of which of the set of two or more contiguous test regions is intersected by the given virtual ray for use by the ray tracing circuitry at a given pipeline stage (P2, P7 as drawn) of operation of the ray tracing circuitry.

The top-left rule as used here (in a two-dimensional variant) defines that a point is considered to overlap the triangle if it meets some predetermined conditions, as derived by the circuitry example of FIG. 13 discussed below.

First create another ray perpendicular to the ray direction.
Perform a dot product of this new ray with the edge vector of interest.
If dot product is positive, point is inside the triangle. If dot product is negative, point is outside the triangle.
If the point lies on a vertex, dot-products with both the edges of interest should return positive values to be considered a hit.

Referring to FIG. 13, the circuitry 1200 receives the ray direction 1300 and the two vertices 1310 of the edge under consideration. These are expressed according to the raw (not reordered) coordinates discussed above.

At the cycle P0, circuitry 1315 computes a vector perpendicular to the ray direction 1300. Adder circuitry 1320 adds the x and y coordinates of the two vertices (as reordered) and comparator circuitry 1325 compares the pairs of coordinates for the two vertices in a lexicographic order, which is to say the non-re-ordered order x,y,z. Here, the sign of the dot product between the perpendicular direction to the ray and the edge gives the relative orientation. If the dot product is 0 the vertices are compared at the circuitry 1325 to obtain the relative orientation.

At the cycle P1, multiplier circuitry 1330 multiplies the respective x and y coordinates of the perpendicular and the output of the adder 1320.

At the cycle P2, comparator circuitry 1335 compares the x and y products generated by the multiplier circuitry 1330 to produce either an equality indicator eq or a greater than indicator gt representing the result of a comparison between the two components of the dot product. One of these is selected as the is_top_left output in response to the output lex_order of the comparator circuitry 1325.

In more detail, the dot product is not calculated completely because only the sign of the dot product is needed. To get the complete dot product an adder would be needed after the multiplications in 1330. The sign of the dot product is in fact derived by the comparator 1335.

If the two inputs to the comparator are equal then the lexicographic order is used
The lexicographic order is computed in parallel to the dot product in 1325 to be used after the comparator.

Summary of Features

The circuitry described above is a fully pipelined unit. Each floating-point operation other than division is completed in one pipeline cycle. Parallel processing is provided of three coordinates and three vertices. Sub-normal or denormal values are simply not allowed. Only two rounding modes are employed.

Method Example

Figure 14:
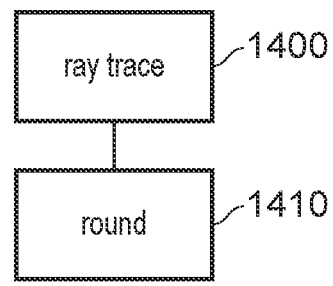
FIG. 14 is a schematic flowchart illustrating a method.

FIG. 14 is a schematic flowchart illustrating a method comprising:

ray tracing (at a step 1400) by a plurality of floating-point processing operations to detect intersection between a virtual ray defined by a ray direction and a test region, the floating-point processing operations operating to a given precision to generate an output floating-point value comprising a significand and an exponent; and for at least some of the plurality of floating-point circuitries, rounding (at a step 1410) using a predetermined directed rounding mode any denormal floating-point value generated by that floating-point processing operation so as to output normal values (for example, only normal values), a denormal floating-point value being a floating-point value in which the significand comprises one or more leading zeroes.

Other Example Implementations

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Therefore, it will be appreciated that example embodiments may encompass a non-transitory computer-readable medium to store computer-readable code for fabrication of the circuitry discussed above.

General Matters

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Circuitry comprising:
ray tracing circuitry comprising a plurality of floating-point circuitries to perform floating-point processing operations to detect intersection between a virtual ray defined by a ray direction and a test region, the floating-point circuitries operating to a given precision to generate an output floating-point value comprising a significand and an exponent, wherein:
at least some of the plurality of floating-point circuitries are configured to round using a predetermined directed rounding mode each denormal floating-point value generated during the floating-point processing operations so as to output a normal value, a denormal floating-point value being a floating-point value in which the significand comprises one or more leading zeroes, and
in at least some of the plurality of floating-point circuitries, the predetermined directed rounding mode is round-to-zero.

2. The circuitry of claim 1, in which at least some of the plurality of floating-point circuitries are configured to round to a minimum normal representation any denormal floating-point value generated by operation of that circuitry.

3. The circuitry of claim 2, in which:
the ray tracing circuitry is responsive to ray data indicating the ray direction, the ray data defining a reciprocal of a ray vector representing the ray direction;
the ray tracing circuitry comprising multiplier circuitry configured to perform a division by the ray vector by implementing a multiplication by the ray data defining the reciprocal of the ray vector;
the ray tracing circuitry is configured to perform processing operations according to clock cycles of a succession of clock cycles, in which each of the floating-point circuitries is configured to perform a respective floating-point operation according to a single respective one of the succession of clock cycles, in which the ray tracing circuitry operates as pipelined circuitry having a plurality of successive pipeline stages; and
in which the ray tracing circuitry is configured to detect intersection of the virtual ray with a hierarchical set of bounding volumes, in which, at a given hierarchy level, each bounding volume comprises a predetermined number of bounding volumes at a next lower hierarchy level and in which the ray tracing circuitry is configured, for the given hierarchy level, to detect intersection of the virtual ray with each of the bounding volumes at the next lower hierarchy level and in which the ray tracing circuitry comprises the predetermined number of intersection-detecting circuitries operable in parallel, one intersection-detecting circuitry being configured to detect intersection for a respective one of the predetermined number of bounding volumes at a next lower hierarchy level.

4. The circuitry of claim 3, comprising conflict detection circuitry configured to determine, for a detection of an intersection between a given virtual ray and a set of two or more contiguous test regions, which of the set of two or more contiguous test regions is intersected by the given virtual ray, in which the conflict detection circuitry is operable in parallel with the ray tracing circuitry to provide the determination of which of the set of two or more contiguous test regions is intersected by the given virtual ray for use by the ray tracing circuitry at a given pipeline stage of operation of the ray tracing circuitry.

5. The circuitry of claim 1, in which the ray tracing circuitry is responsive to ray data indicating the ray direction, the ray data defining a reciprocal of a ray vector representing the ray direction;
the ray tracing circuitry comprising multiplier circuitry configured to perform a division by the ray vector by implementing a multiplication by the ray data defining the reciprocal of the ray vector.

6. The circuitry of claim 1, in which the ray tracing circuitry is configured to perform processing operations according to clock cycles of a succession of clock cycles.

7. The circuitry of claim 6, in which each of the floating-point circuitries is configured to perform a respective floating-point operation according to a single respective one of the succession of clock cycles.

8. The circuitry of claim 6, in which the ray tracing circuitry operates as pipelined circuitry having a plurality of successive pipeline stages.

9. The circuitry of claim 8, comprising conflict detection circuitry configured to determine, for a detection of an intersection between a given virtual ray and a set of two or more contiguous test regions, which of the set of two or more contiguous test regions is intersected by the given virtual ray.

10. The circuitry of claim 9, in which the conflict detection circuitry is operable in parallel with the ray tracing circuitry to provide the determination of which of the set of two or more contiguous test regions is intersected by the given virtual ray for use by the ray tracing circuitry at a given pipeline stage of operation of the ray tracing circuitry.

11. The circuitry of claim 1, in which the ray tracing circuitry is configured to detect intersection of the virtual ray with a hierarchical set of bounding volumes.

12. The circuitry of claim 11, in which, at a given hierarchy level, each bounding volume comprises a predetermined number of bounding volumes at a next lower hierarchy level.

13. The circuitry of claim 12, in which the ray tracing circuitry is configured, for the given hierarchy level, to detect intersection of the virtual ray with each of the bounding volumes at the next lower hierarchy level.

14. The circuitry of claim 13, in which the ray tracing circuitry comprises the predetermined number of intersection-detecting circuitries operable in parallel, one intersection-detecting circuitry being configured to detect intersection for a respective one of the predetermined number of bounding volumes at a next lower hierarchy level.

15. The circuitry of claim 14, in which the predetermined number is 6.

16. A graphics processing unit having a hardware ray tracing accelerator comprising the circuitry of claim 1.

17. A non-transitory computer-readable medium storing computer-readable code for fabrication of the circuitry of claim 1.

18. A method comprising:
performing ray tracing circuitry by a plurality of floating-point processing operations to detect intersection between a virtual ray defined by a ray direction and a test region, the floating-point processing operations operating to a given precision to generate an output floating-point value comprising a significand and an exponent;
for at least some of the plurality of floating-point circuitries, rounding using a predetermined directed rounding mode each denormal floating-point value generated during the floating-point processing operation so as to output a normal value, a denormal floating-point value being a floating-point value in which the significand comprises one or more leading zeroes; and
in at least some of the plurality of floating-point circuitries, the predetermined directed rounding mode is round-to-zero.

* * * * *